(12) United States Patent
Kiyohara et al.

(10) Patent No.: US 10,067,514 B2
(45) Date of Patent: Sep. 4, 2018

(54) SUBSTRATE PROCESSING APPARATUS AND LIQUID MIXING METHOD

(71) Applicant: Tokyo Electron Limited, Tokyo (JP)

(72) Inventors: Yasuo Kiyohara, Kumamoto (JP); Ikuo Sunaka, Kumamoto (JP); Koji Tanaka, Beaverton, OR (US); Takami Satoh, Kumamoto (JP); Kazuyoshi Mizumoto, Kumamoto (JP); Takashi Uno, Kumamoto (JP); Hirotaka Maruyama, Kumamoto (JP); Hidetomo Uemukai, Kumamoto (JP); Tomiyasu Maezono, Kumamoto (JP)

(73) Assignee: Tokyo Electron Limited, Tokyo (JP)

( * ) Notice: Subject to any disclaimer, the term of this patent is extended or adjusted under 35 U.S.C. 154(b) by 771 days.

(21) Appl. No.: 14/543,951

(22) Filed: Nov. 18, 2014

(65) Prior Publication Data

US 2015/0146498 A1    May 28, 2015

(30) Foreign Application Priority Data

Nov. 25, 2013  (JP) ................................. 2013-243268
Sep. 30, 2014  (JP) ................................. 2014-201944

(51) Int. Cl.
*B01F 15/04*    (2006.01)
*B01F 15/02*    (2006.01)
(Continued)

(52) U.S. Cl.
CPC ............ *G05D 11/132* (2013.01); *B01F 3/088* (2013.01); *B01F 15/0479* (2013.01)

(58) Field of Classification Search
CPC ..... G05D 11/132; B01F 3/088; B01F 15/0479
See application file for complete search history.

(56) References Cited

U.S. PATENT DOCUMENTS 6,457,852 B1 * 10/2002 Hiraoka ................. B01F 3/088
                                                    366/136
7,728,174 B2 *  6/2010 Hugo .................... C07C 209/48
                                                    564/385
(Continued)

FOREIGN PATENT DOCUMENTS

CN    102179200 A    9/2011
CN    102806027 A    12/2012
(Continued)

*Primary Examiner* — Queenie S Dehghan
(74) *Attorney, Agent, or Firm* — Abelman, Frayne & Schwab

(57) ABSTRACT

A substrate processing apparatus includes a mixing tank, a first opening/closing valve, a second opening/closing valve, a first flow rate measuring unit, a second flow rate measuring unit, a control unit, and a substrate processing unit. A first liquid and a second liquid are mixed such that the second liquid is mixed in an amount more than that of the first liquid. The first and second opening/closing valves open/close a first flow path and a second flow path, respectively. The first and second flow rate measuring units measure flow rates of the first and second liquids flowing through the first and second flow paths, respectively. The control unit controls opening/closing of the first opening/closing valve and the second opening/closing valve. The substrate processing unit processes a substrate by supplying a mixed liquid of the first and second liquids to the substrate.

9 Claims, 8 Drawing Sheets

(51) Int. Cl.
    *B01F 3/08*          (2006.01)
    *G05D 11/13*       (2006.01)

(56) References Cited

U.S. PATENT DOCUMENTS

| | | | |
|---|---|---|---|
| 2006/0045816 A1* | 3/2006 | Jang | G05D 11/132 |
| | | | 422/110 |
| 2009/0188565 A1* | 7/2009 | Satake | B01F 13/1055 |
| | | | 137/3 |
| 2013/0168326 A1* | 7/2013 | Bouchard | B01F 3/0803 |
| | | | 210/738 |
| 2015/0043302 A1* | 2/2015 | Kamiya | B01F 15/0416 |
| | | | 366/152.1 |
| 2015/0306552 A1* | 10/2015 | Erban | B01F 15/00149 |
| | | | 261/59 |

FOREIGN PATENT DOCUMENTS

| | | |
|---|---|---|
| JP | 06-294674 A | 10/1994 |
| JP | 11-165118 A | 6/1999 |
| JP | 2001-162148 A | 6/2001 |
| JP | 2003-275569 A | 9/2003 |
| JP | 2009-172459 A | 8/2009 |
| TW | 200609033 A | 3/2006 |
| WO | WO2013182467 | * 12/2013 |

* cited by examiner

SUBSTRATE PROCESSING APPARATUS AND LIQUID MIXING METHOD

CROSS-REFERENCE TO RELATED APPLICATIONS

This application is based on and claims priority from Japanese Patent Application Nos. 2013-243268 and 2014-201944 filed on Nov. 25, 2013 and Sep. 30, 2014, respectively, with the Japan Patent Office, the disclosures of which are incorporated herein in their entireties by reference.

TECHNICAL FIELD

Exemplary embodiments disclosed herein relate to a substrate processing apparatus and a liquid mixing method.

BACKGROUND

In the related art, a substrate processing apparatus that processes a substrate such as, for example, a semiconductor wafer or a glass substrate, by supplying a processing liquid to the substrate is known.

A processing liquid used in the substrate processing apparatus may be produced by mixing a plurality of liquids in a predetermined ratio. In such a case, the substrate processing apparatus includes a mixing apparatus that produces the processing liquid by mixing the plurality of liquids.

A mixing apparatus described in Japanese Patent Laid-Open Publication No. 2003-275569 includes a mixing tank in which a plurality of liquids are mixed, a flow rate control unit that supplies the plurality of liquids to the mixing tank by a predetermined amount, a supplying time control unit that performs a control such that time lengths of supplying the plurality of liquids to the mixing tank become equal to each other.

Further, Japanese Patent Laid-Open Publication No. 2009-172459 discloses a mixing apparatus configured to supply each liquid to a mixing tank after all the liquids reach a predetermined flow rate so that a processing liquid with a predetermined mixing ratio may be produced from the beginning of supplying the liquids.

SUMMARY

A substrate processing apparatus according to an aspect of the present disclosure includes a mixing tank, a first opening/closing valve, a second opening/closing valve, a first flow rate measuring unit, a second flow rate measuring unit, a control unit, and a substrate processing unit. A first liquid and a second liquid are mixed in the mixing tank such that the second liquid is mixed in an amount more than that of the first liquid. The first opening/closing valve is configured to open/close a first flow path in which the first liquid flows. The second opening/closing valve is configured to open/close a second flow path in which the second liquid flows. The first flow rate measuring unit is configured to measure a flow rate of the first liquid flowing through the first flow path. The second flow rate measuring unit is configured to measure a flow rate of the second liquid flowing through the second flow path. The control unit is configured to control opening/closing of the first opening/closing valve and the second opening/closing valve. The substrate processing unit is configured to process a substrate by supplying a mixed liquid of the first liquid and the second liquid to the substrate. When an integrated value of the flow rate of the first liquid measured by the first flow rate measuring unit reaches a predetermined target value after the first opening/closing valve is opened, the control unit executes a first closing processing to close the first opening/closing valve, calculates a target value of an amount of the second liquid to be supplied to the mixing tank based on the integrated value of the first liquid flow rate from the opening of the first opening/closing valve to the complete closing of the first opening/closing valve, and executes a second closing processing to close the second opening/closing valve based on the calculated target value and an integrated value of the flow rate of the second liquid measured by the second flow rate measuring unit.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

DETAILED DESCRIPTION

Figure 1:
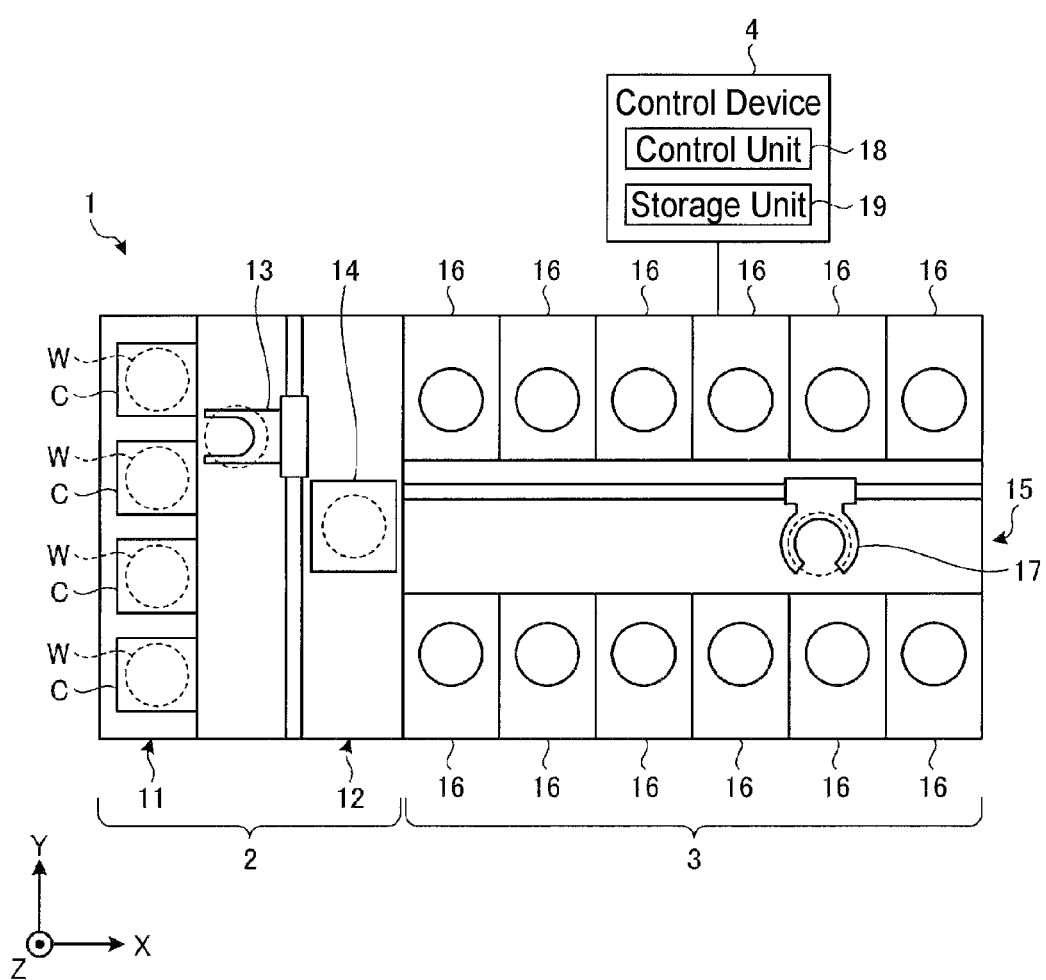
FIG. 1 is a view illustrating a schematic configuration of a substrate processing system according to a first exemplary embodiment.

In the following detailed description, reference is made to the accompanying drawings, which form a part hereof. The exemplary embodiments described in the detailed description, drawing, and claims are not meant to be limiting. Other exemplary embodiments may be utilized, and other changes may be made, without departing from the spirit or scope of the subject matter presented here.

The conventional technology described above still has a room for improvement in enhancing accuracy in the mixing ratio.

For example, a time lag exists until a valve that opens and closes a flow path is completely closed after a closing signal is output to the valve. Thus, the mixing ratio may be deviated from a desired value by an amount of a liquid flowing into the mixing tank during the time lag.

An aspect of the present disclosure is to provide a substrate processing apparatus and a liquid mixing method that may enhance accuracy in a mixing ratio.

A substrate processing apparatus according to an aspect of the present disclosure includes a mixing tank, a first opening/closing valve, a second opening/closing valve, a first flow rate measuring unit, a second flow rate measuring unit, a control unit, and a substrate processing unit. A first liquid and a second liquid are mixed in the mixing tank such that the second liquid is mixed in an amount more than that of the first liquid. The first opening/closing valve is configured to open/close a first flow path in which the first liquid flows. The second opening/closing valve is configured to open/close a second flow path in which the second liquid flows. The first flow rate measuring unit is configured to measure a flow rate of the first liquid flowing through the first flow path. The second flow rate measuring unit is configured to measure a flow rate of the second liquid flowing through the second flow path. The control unit is configured to control opening/closing of the first opening/closing valve and the second opening/closing valve. The substrate processing unit is configured to process a substrate by supplying a mixed liquid of the first liquid and the second liquid to the substrate. When an integrated value of the flow rate of the first liquid measured by the first flow rate measuring unit reaches a predetermined target value after the first opening/closing valve is opened, the control unit executes a first closing processing to close the first opening/closing valve, calculates a target value of an amount of the second liquid to be supplied to the mixing tank based on the integrated value of the first liquid flow rate from the opening of the first opening/closing valve to the complete closing of the first opening/closing valve, and executes a second closing processing to close the second opening/closing valve based on the calculated target value and an integrated value of the flow rate of the second liquid measured by the second flow rate measuring unit.

The control unit of the above-described substrate processing apparatus calculates a target value of an amount of the second liquid to be supplied to the mixing tank based on the integrated value of the first liquid flow rate at a time point where a predetermined delay time elapses after the first opening/closing valve is completely closed after executing the first closing processing.

The control unit notifies an abnormality when the integrated value increases after the predetermined delay time elapses.

The substrate processing apparatus described above further including a flow rate adjusting unit which is configured to adjust the flow rate of the first liquid flowing through the first flow path or the flow rate of the second liquid flowing through the second flow path. And the control unit controls the flow rate adjusting unit such that a ratio of the first liquid flowing through the first flow path becomes more than a target mixed ratio of the first liquid and the second liquid.

The above-described substrate processing apparatus further including a flow rate adjusting unit to adjust the flow rate of the second liquid flowing through the second flow path. And the control unit controls the flow rate adjusting unit after the first closing processing such that the flow rate of the second liquid becomes smaller than the flow rate of the second liquid before the first closing processing.

In the above-described substrate processing apparatus, the control unit executes the second closing processing when the integrated value of the flow rate of the second liquid measured by the second flow rate measuring unit reaches a value obtained by subtracting a predetermined correction value from the calculated target value.

In the above-described substrate processing apparatus, the correction value is determined based on the flow rate of the second liquid passing through the second flow path in a time until the second opening/closing valve is closed after the second closing processing begins.

In the above-described substrate processing apparatus, a mixing unit is provided between the first and the second flow path and the mixing tank, and is configured to mix the first liquid and the second liquid, and then supply the mixed liquid to the mixing tank. And when supply of the first liquid and the second liquid to the mixed tank is started, the control unit opens the first opening/closing valve and the second opening/closing valve simultaneously when the first liquid and the second liquid are supplied into the mixing tank.

According to another aspect of an exemplary embodiment with respect to a liquid mixing method of mixing a first liquid and a second liquid such that the second liquid is mixed in an amount more than that of the first liquid includes: a first integrated value acquiring step of acquiring an integrated value of a flow rate of the first liquid flowing through a first flow path in which the first liquid flows; a first closing step of closing a first opening/closing valve configured to open/close the first flow path when the integrated value of the flow rate of the first liquid which is acquired in the first integrated value acquiring step reaches a predetermined target value; a second integrated value acquiring step of acquiring the integrated value of the flow rate of the first liquid flowing through the first flow path after the first closing step; a calculating step of calculating a target value of a supplied amount of the second liquid based on the integrated value of the flow rate of the first liquid which is acquired in the first integrated value acquiring step and the integrated value of the flow rate of the first liquid acquired in the second integrated acquiring step; a third integrated value acquiring step of acquiring an integrated value of a flow rate of the second liquid flowing through the second flow path in which the second liquid flows; and a second closing step of executing a second closing processing to close the second opening/closing valve configured to open/close the second flow path, based on the target value calculated in the calculation step and the integrated value of the flow rate of the second liquid acquired in the third integrated value acquiring step.

According to an aspect of an exemplary embodiment, accuracy in a mixing ratio of liquids may be enhanced.

Hereinafter, a substrate processing apparatus and a liquid mixing method disclosed herein will be described in detail with reference to accompanying drawings. The present disclosure is not limited by exemplary embodiments described below.

First Exemplary Embodiment

FIG. 1 is a view illustrating a schematic configuration of a substrate processing system according to a first exemplary embodiment. Hereinafter, in order to clarify positional relationships, X-axis, Y-axis, and Z-axis are defined as being orthogonal to each other, and a positive X-axis direction is regarded as a vertically upward direction.

As illustrated in FIG. 1, the substrate processing system 1 includes a carry-in/out system 2 and a processing station 3. The carry-in/out system 2 is provided adjacent to the processing station 3.

The carry-in/out system 2 includes a carrier placing section 11 and a conveyance section 12. A plurality of carriers C is disposed in the carrier placing section 11 to accommodate a plurality of substrates (semiconductor wafers (hereinafter, referred to as "wafers W") in the first exemplary embodiment) in a horizontal state.

The conveyance section 12 is provided adjacent to the carrier placing section 11, and includes a substrate conveyance apparatus 13 and a delivery unit 14 therein. The substrate conveyance apparatus 13 includes a wafer holding mechanism configured to hold a wafer W. Also, the substrate conveyance apparatus 13 may move in horizontal and vertical directions, and rotate around a vertical axis as a center to perform conveyance of wafers W between the carriers C and the delivery unit 14 using the wafer holding mechanism.

The processing station 3 is provided adjacent to the conveyance section 12. The processing station 3 includes a conveyance section 15 and a plurality of processing units 16. The plurality of processing units 16 is aligned side by side on both sides of the conveyance section 15.

A substrate conveyance apparatus 17 is provided inside of the conveyance section 15. The substrate conveyance apparatus 17 includes a wafer holding mechanism configured to hold a wafer W. Also, the substrate conveyance apparatus 17 may move in horizontal and vertical directions, and rotate around a vertical axis as a center, and performs conveyance of wafers W between the delivery unit 14 and the processing units 16 using the wafer holding mechanism.

Each of the processing units 16 performs a predetermined substrate processing on the wafers conveyed by the substrate conveyance apparatus 17.

Also, the substrate processing system 1 includes a control device 4. The control device 4 is, for example, a computer which includes a control unit 18 and a storage unit 19. In the storage unit 19, a program that controls various processings executed in the substrate processing system 1 is stored. The control unit 18 controls the execution of the substrate processing system 1 by reading out and executing the program stored in the storage unit 19.

The program may be a program stored in a computer-readable storage medium and installed to the storage unit 19 of the control device 4 from the storage medium. The computer-readable storage medium may include, for example, a hard disk (HD), a flexible disk (FD), a compact disc (CD), a magnet optical disk (MO), or a memory card.

In the substrate processing system 1 configured as described above, the substrate conveyance apparatus 13 of the conveying-in/out station 2 takes a wafer W out from a carrier C placed on the carrier placing section 11, and then, places the wafer W taken out from the carrier C to the delivery unit 14. The wafer W placed on the delivery unit 14 is taken out from the delivery unit 14 by the substrate conveyance apparatus 17 of the processing station 3 and conveyed into a processing unit 16.

The wafer W conveyed into the processing unit 16 is processed by the processing unit 16, then conveyed out of the processing unit 16 by the substrate conveyance apparatus 17, and then placed on the delivery unit 14. Also, the wafer W processed and placed on the delivery unit 14 is returned back to the carrier C of the carrier placing section 11 by the substrate conveyance apparatus 13.

Figure 2:
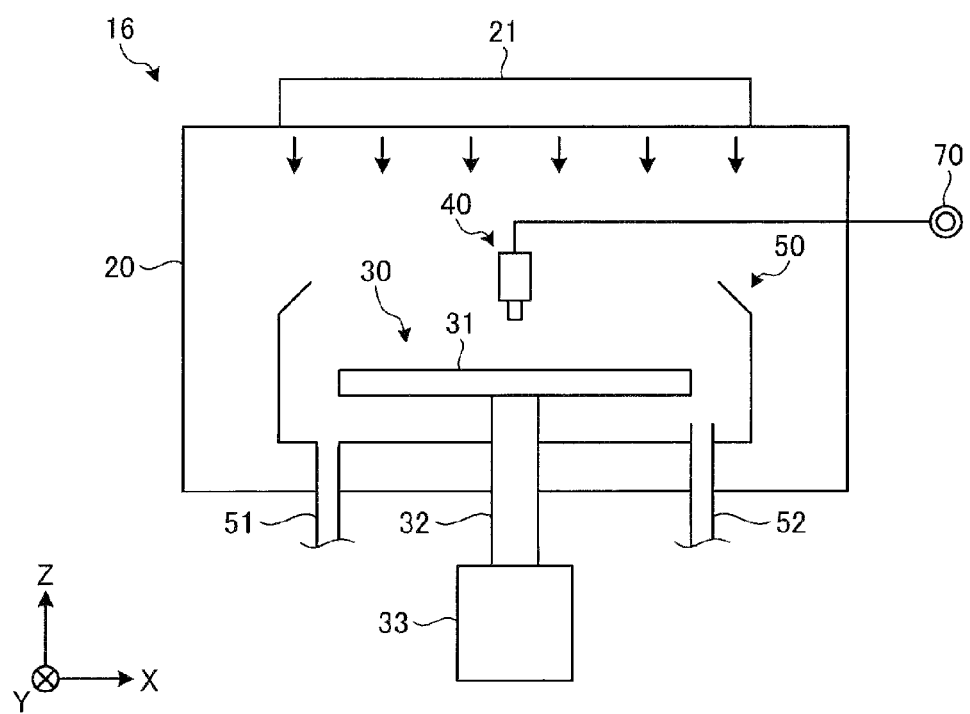
FIG. 2 is a view schematically illustrating a configuration of a processing unit according to the first exemplary embodiment.

Subsequently, a configuration of the processing unit 16 will be described with reference to FIG. 2. FIG. 2 is a view illustrating a schematic configuration of the processing unit 16 according to the first exemplary embodiment.

As illustrated in FIG. 2, the processing unit 16 includes a chamber 20, a substrate holding mechanism 30, a processing liquid supply unit 40, and a recovery cup 50.

The chamber 20 accommodates the substrate holding mechanism 30, the processing liquid supply unit 40, and the recovery cup 50. In a ceiling portion of the chamber 20, a fan filter unit ("FFU") 21 is provided. The FFU 21 forms a down flow inside the chamber 20.

The substrate holding mechanism 30 includes a holding unit 31, a supporting unit 32, and a driving unit 33. The holding unit 31 holds the wafer W horizontally. The supporting unit 32 is a member extending in the vertical direction in which the base end is rotatably supported by the driving unit 33, and the upper end of the supporting unit 32 horizontally supports the holding unit 31. The driving unit 33 rotates the supporting unit 32 around the vertical axis. The substrate holding mechanism 30 rotates the supporting unit 32, using the driving unit 33 to rotate the holding unit 31 held by the supporting unit 32 and hence to rotate the wafer W held on the holding unit 31.

The processing liquid supply unit 40 supplies a processing liquid to the wafer W. The processing liquid supply unit 40 is connected to a processing liquid supply source 70.

The recovery cup 50 is disposed to surround the holding unit 31, and collects the processing liquid scattered from the wafer W by the rotation of the holding unit 31. In the bottom portion of the recovery cup 50, a liquid discharge port 51 is formed, and the processing liquid collected by the recovery cup 50 is discharged to the outside of the processing unit 16 through the liquid discharge port 51. Also, in the bottom portion of the recovery cup 50, an exhaust port 52 is formed so as to exhaust a gas supplied from the FFU 21 to the outside of the processing unit 16.

The processing unit 16 according to the first exemplary embodiment etches and removes a film formed on the wafer W by supplying dilute hydrofluoric acid (DHF) supplied from the processing liquid supply source 70 to the wafer W. Also, the processing liquid supply source 70 according to the first exemplary embodiment produces DHF by mixing hydrofluoric acid (HF) and DIW (pure water of about 20° C.), and supplies the produced DHF to each processing unit 16.

Figure 3:
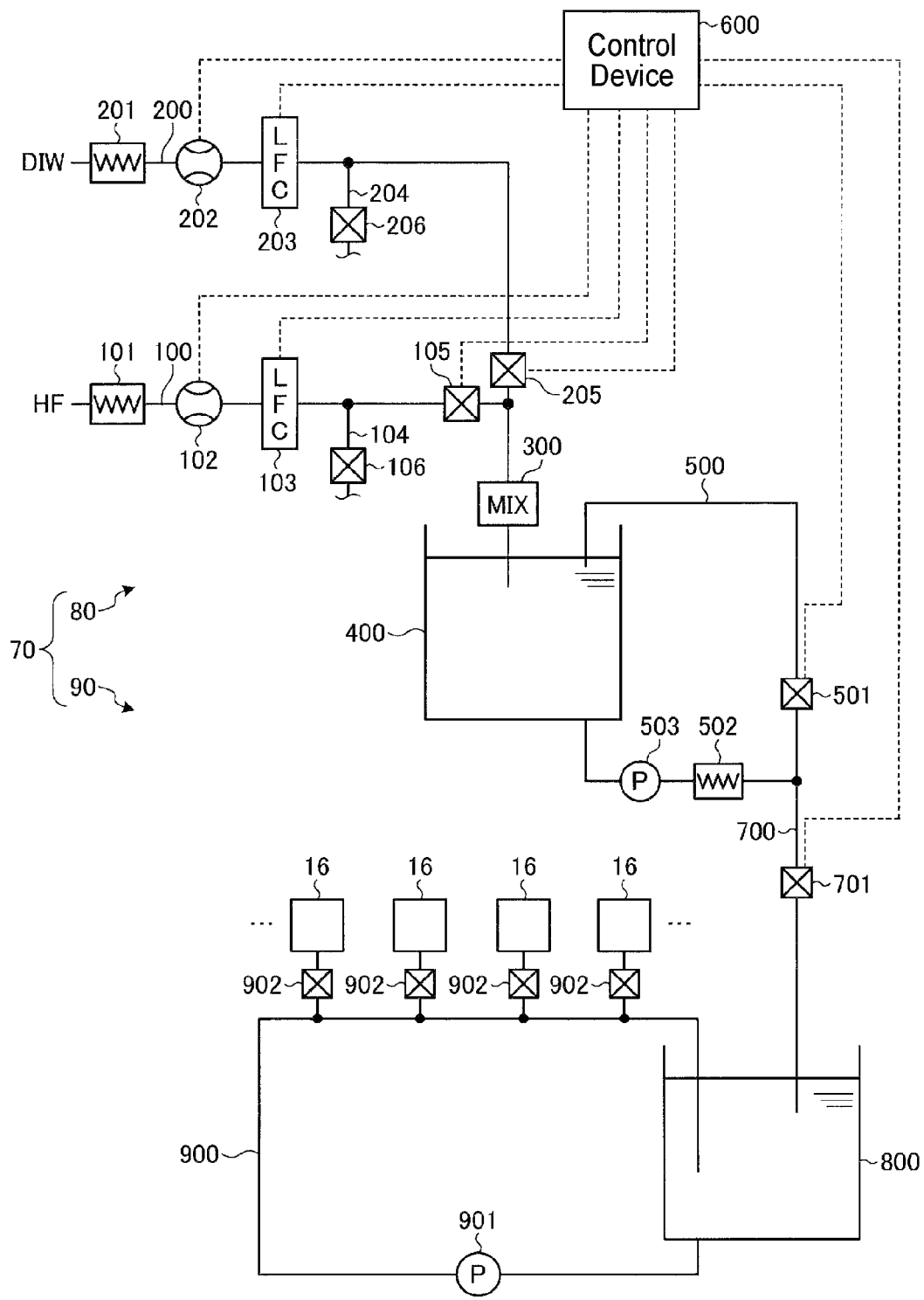
FIG. 3 is a view illustrating a configuration of a processing liquid supply source according to the first exemplary embodiment.

Next, a configuration of the processing liquid supply source 70 according to the first exemplary embodiment will be described with reference to FIG. 3. FIG. 3 is a view illustrating a configuration of the processing liquid supply source 70 according to the first exemplary embodiment.

As illustrated in FIG. 3, the processing liquid supply source 70 according to the first exemplary embodiment includes a mixing apparatus 80 and a supplying apparatus 90.

The mixing apparatus 80 includes a first flow path 100, a second flow path 200, a mixing unit 300, a mixing tank 400, a first circulation line 500, and a second control device 600. Also, the supplying apparatus 90 includes a third flow path 700, a storage tank 800, and a second circulation line 900.

First, a configuration of the mixing apparatus 80 will be described. The first flow path 100 is a flow path where the first liquid, HF, flows. In the first flow path 100, a HF temperature adjusting mechanism 101, a first flow rate measuring unit 102, a first flow rate adjusting unit 103, a first disposal line 104, and a first opening/closing valve 105 are provided in this order from the upstream towards the downstream.

The HF temperature adjusting mechanism 101 adjusts the temperature of HF flowing through the first flow path 100. For example, a water jet is used for the HF temperature adjusting mechanism 101. The first flow rate measuring unit 102 measures the flow rate of HF flowing through the first flow path 100. The result measured by the first flow rate measuring unit 102 is output to the second control device 600. The first flow rate adjusting unit 103 is controlled by the second control device 600 to adjust the flow rate of HF flowing through the first flow path 100.

The first disposal line 104 is a flow path diverged from the first flow path 100 and is used to cause HF to flow therein, for example, until the flow rate of HF becomes stable. A third opening/closing valve 106 is provided in the first disposal line 104. The first opening/closing valve 105 is a valve configured to open/close the first flow path 100, and is controlled by the second control device 600.

The second flow path 200 is a flow path in which the second liquid, DIW, flows. In the second flow path 200, a DIW temperature adjusting mechanism 201, a second flow rate measuring unit 202, a second flow rate adjusting unit 203, a second closing line 204, and a second opening/closing valve 205 are provided in this order from the upstream towards the downstream.

DIW is a diluting liquid to dilute HF, in which DIW is supplied to a mixing tank 400 in an amount larger than that of HF. The mixing tank 400 will be described below.

The DIW temperature adjusting mechanism 201 adjusts the temperature of DIW flowing through the second flow path 200. For example, a water jet is used for the DIW temperature adjusting mechanism 201. The second flow rate measuring unit 202 measures the flow rate of DIW flowing through the second flow path 200. The result measured by the second flow rate measuring unit 202 is output to the second control device 600. The second flow rate adjusting unit 203 is controlled by the second control device 600 to adjust the flow rate of DIW flowing through the second flow path 200.

The second disposal line 204 is a flow path diverged from the second flow path 200 and is used to cause DIW to flow therein, for example, until the flow rate of DIW becomes stable. A fourth opening/closing valve 206 is provided in the second disposal line 204. The second opening/closing valve 205 is a valve configured to open/close the second flow path 200, and is controlled by the second control device 600.

The first flow path 100 and the second flow path 200 are connected with each other in a connecting portion at a more downstream side than the first opening/closing valve 105 and the second opening/closing valve 205, and connected to the mixing tank 400 through the mixing unit 300 at a more downstream side than the connecting portion.

The mixing unit 300 is provided between the first flow path 100 and the second flow path 200, and the mixing tank 400 so as to mix HF and DIW and supply a mixture liquid thereof to the mixing tank 400 in which HF is supplied from the first flow path 100 and DIW is supplied from the second flow path 200.

The mixing tank 400 reserves DHF which is the mixture liquid of HF and DIW. HF and DIW are mixed in the mixing unit 300 and supplied to the mixing tank 400. Then, HF and DIW are further mixed in the mixing tank 400 and the first circulation line 500 to be described below.

The first exemplary embodiment exemplifies a case in which HF and DIW are mixed in the mixing unit 300 and then supplied to the mixing tank 400. However, the mixing unit 300 may be omitted and HF and DIW gases may be separately supplied to the mixing tank 400.

The first circulation line 500 is a flow path with each end being connected to the mixing tank 400. In the first circulation line 500, a fifth opening/closing valve 501, a DHF temperature adjusting mechanism 502, and a pump 503 are provided in this order.

The fifth opening/closing valve 501 opens/closes the first circulation line 500, and is controlled by the second control device 600. The DHF temperature adjusting mechanism 502 adjusts the temperature of DHF flowing through the first circulation line 500. For example, coolnics may be used for the DHF temperature adjusting mechanism 502. The pump 503 pushes out DHF within the first circulation line 500 from the upstream side to the downstream side.

When it is desired to enhance, for example, DHF cooling capability in a conventional mixing apparatus, for example, by providing two coolnicses serving as the DHF temperature adjusting mechanisms in parallel. However, since the coolnicses are relatively expensive and high in power consumption even though the temperature adjusting accuracy thereof is high, the costs or power consumption of the mixing apparatus may increase when the number of coolnicses increases.

Therefore, in the mixing apparatus 80 according to the first exemplary embodiment, the HF temperature adjusting mechanism 101 and the DIW temperature adjusting mechanism 201 are provided in the first flow path 100 and the second flow path 200, respectively, so as to adjust the temperatures of HF and DIW in advance before they are mixed. Since the water jets used for the HF temperature adjusting mechanism 101 and the DIW temperature adjusting mechanism 201 are more inexpensive than the coolnicses and the power consumption of the water jets is lower than that of the coolnicses, the costs and power consumption of the mixing apparatus may be reduced.

The DHF temperature adjusting mechanism 502 corresponds to an example of the first temperature adjusting mechanism, the HF temperature adjusting mechanism 101 and the DIW temperature adjusting mechanism 201 correspond to an example of the second temperature adjusting mechanism. Here, although the HF temperature adjusting mechanism 101 and the DIW temperature adjusting mechanism 201 are provided in the first flow path 100 and the second flow path 200, respectively, the temperature adjusting mechanisms may be provided only in any one of the first flow path 100 and the second flow path 200. Also, when it is not necessary to enhance the cooling ability of DHF, the mixing apparatus 80 does not necessarily have to be provided with the HF temperature adjusting mechanism 101 and DIW temperature adjusting mechanism 201.

The temperature of DHF reserved in the mixing tank 400 is adjusted to a predetermined temperature by the DHF temperature adjusting mechanism 502 while DHF circulates through the first circulation line 500.

The second control device 600 controls the mixing apparatus 80, and includes a second control unit and a second storage unit which will be described below. In the second storage unit, a program that controls various processes executed in the mixing apparatus 80 is stored. The second control unit controls the execution of the mixing apparatus 80 by reading out and executing the program stored in the second storage unit.

The program may be that stored in a computer-readable storage medium and installed to the second storage unit of the second control device 600 from the storage medium. The computer-readable storage medium may include, for example, a hard disk (HD), a flexible disk (FD), a compact disc (CD), a magnet optical disk (MO), or a memory card.

As illustrated in FIG. 3, the second flow path 200 in which DIW flows forms a main stream and the first flow path 100 in which HF flows forms a tributary stream in the mixing apparatus 80. Accordingly, since DIW flows through the second flow path after the supply of HF is stopped, HF remaining between the connection portion of the first flow path 100 and the second flow path 200 and the first opening/closing valve 105 may be drawn by DIW to flow to the mixing tank 400. Thus, the accuracy in mixing ratio may be enhanced.

Subsequently, a configuration of the supplying apparatus 90 will be described. The third flow path 700 is connected to a middle portion of the first circulation line 500, for example, between the fifth opening/closing valve 501 and the DHF temperature adjusting mechanism 502, and supplies DHF flowing through the first circulation line 500 to the storage tank 800. A sixth opening/closing valve 701 is provided in the third flow path 700. The sixth opening/closing valve 701 opens/closes the third flow path 700, and is controlled by the second control device 600.

The storage tank 800 reserves DHF supplied through the third flow path 700 from the mixing apparatus 80. The both ends of the second circulation line 900 are connected to the storage tank 800. In the second circulation line 900, a pump 901 is provided, and the plurality of processing units 16 is connected to the second circulation line 900 through the seventh opening/closing valve 902. The pump 901 pushes out DHF in the second circulation line 900 from the upstream side towards the downstream side.

The processing liquid supply source 70 is configured as described above, the mixing apparatus 80 produces DHF by mixing HF and DIW, and the supplying apparatus 90 supplies DHF produced by the mixing apparatus 80 to the processing liquid supply unit 40 of each processing unit 16.

Figure 4:
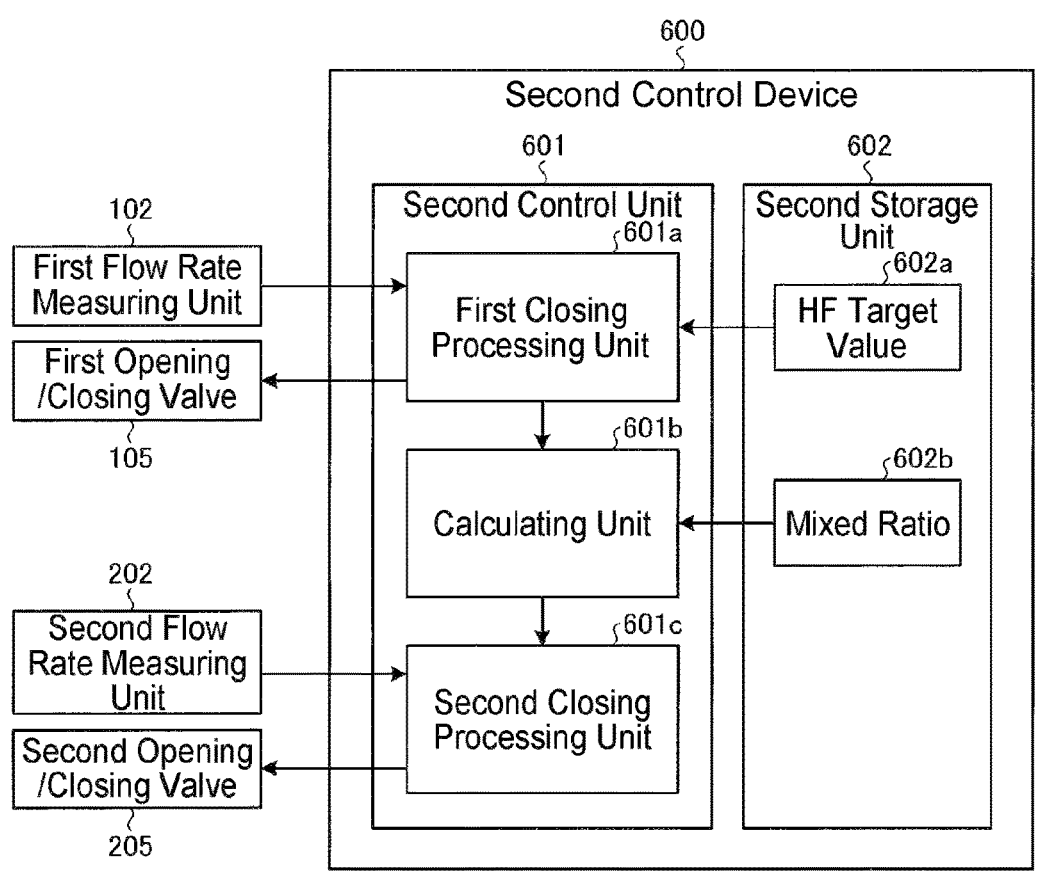
FIG. 4 is a block diagram illustrating a configuration of a control device according to the first exemplary embodiment.

Next, a configuration of the second control device 600 according to the first exemplary embodiment will be described with reference to FIG. 4. FIG. 4 is a block diagram illustrating a configuration of the second control device 600 according to the first exemplary embodiment. In FIG. 4, necessary constituent elements are only illustrated so as to describe a feature of the second control device 600 and illustration of general constituent elements is omitted.

As illustrated in FIG. 4, the second control device 600 includes a second control unit 601 and a second storage unit 602.

The second control unit 601 is, for example, a CPU (Central Processing Unit), and functions as a first closing processing unit 601a, a calculating unit 601b, and a second closing processing unit 601c. Furthermore, the second control unit 601 may be configured only by hardware without using a program.

The second control unit 601 includes the first closing processing unit 601a, the calculating unit 601b, and the second closing processing unit 601c. The second storage unit 602 stores a HF target value 602a which is a predetermined amount, and a predetermined mixed ratio 602b.

The HF target value 602a refers to a target value of an amount of HF supplied to the mixing tank 400, and is stored to the second storage unit 602 in advance by, for example, an operator. Also, the mixed ratio 602b refers to a target value of a mixed ratio of HF and DIW, and is stored to the second storage unit 602 in advance by, for example, the operator, like the HF target value 602a.

When the amount of HF supplied to the mixing tank 400 reach the target value, the first closing processing unit 601a stops supplying HF to the mixing tank 400 by closing the first opening/closing valve 105.

Specifically, the first closing processing unit 601a acquires a flow rate of HF flowing through the first flow path 100 after the first opening/closing valve 105 is opened from the first flow rate measuring unit 102, and calculates an integrated value of the flow rate of HF from the acquired flow rate of HF. Further, when the calculated integrated value reaches the stored HF target value 602a of the second storage unit 602, the first closing processing unit 601a outputs a closing signal to close the first opening/closing valve 105 to a driving unit of the first opening/closing valve 105, as the first closing processing. Accordingly, the first opening/closing valve 105 is closed so that the supply of HF to the mixing tank 400 is stopped.

Here, a time lag exists until the first opening/closing valve 105 is completely closed after the first closing processing unit 601a outputs the closing signal. Thus, HF is supplied to the mixing tank 400 although small in amount even after the first closing processing unit 601a outputs the closing signal. As a result, the amount of HF supplied to the mixing tank 400 slightly deviates from the HF target value 602a.

For example, when the HF target value 602a is 100 mL, the first closing processing unit 601a outputs the closing signal to the first opening/closing valve 105 when the integrated value of the flow rate of HF reaches 100 mL. However, as described above, since the time lag exists until the first opening/closing valve 105 is completely closed after the first closing processing unit 601a outputs the closing signal, more than 100 mL of the HF (e.g., 101 mL) is supplied to the mixing tank 40.

When the supplied amount of HF deviates from the HF target value 602a as described above, the mixed ratio of HF and DIW also deviates from the target value. Since the deviation in the mixed ratio affects an etching amount, it is desired to reduce the deviation of the mixed ratio as much as possible.

The processing of calculating the integrated value of the flow rate of HF does not necessarily have to be performed by the first closing processing unit 601a. For example, when the first flow rate measuring unit 102 or the first flow rate adjusting unit 103 has a function of measuring the integrated value of the flow rate, the first closing processing unit 601a may directly acquire the integrated value of the flow rate of HF from the first flow rate measuring unit 102 or the first flow rate adjusting unit 103. This may also be applied to the second closing processing unit 601c to be described later.

The first closing processing unit 601a continuously calculates the integrated value of the flow rate of HF even after the first closing processing, and outputs the calculated integrated value to the calculating unit 601b to be described later.

The calculating unit 601b calculates the target value of the amount of DIW to be supplied to the mixing tank 400 based on the integrated value of the flow rate of HF from the opening of the first opening/closing valve to the closing of the first opening/closing valve, that is, the amount of HF actually supplied to the mixing tank 400.

Specifically, the calculating unit 601b acquires the integrated value of the flow rate of HF in the first closing processing (which may be referred to as an "actually supplied amount of HF") from the first closing processing unit 601a. In addition, the calculating unit 601b calculates the target value of the amount of DIW to be supplied to the mixing tank 400, using the actually supplied amount of HF which is acquired from the first closing processing unit 601a and the mixed ratio 602b stored in the second storage unit 602.

For example, it is assumed that the actually supplied amount of HF is 101 mL, and the mixed ratio 602b is HF:DIW=1:100. In such a case, the calculating unit 601b calculates 10.1 L (101 mL×100=1000 mL) as the target value of the amount of DIW to be supplied. The calculating unit 601b outputs the calculated target value of DIW to the second closing processing unit 601c.

The second closing processing unit 601c stops supplying DIW to the mixing tank 400 by closing the second opening/closing valve 205 when the amount of DIW supplied to the mixing tank reaches the target value calculated by the calculating unit 601b.

Specifically, the second closing processing unit 601c acquires the flow rate of DIW flowing through the second flow path 200 from the second flow rate measuring unit 202, and calculates the integrated value of the flow rate of DIW from the acquired flow rate of DIW. Furthermore, as the second closing processing when the calculated integrated value reaches the target value acquired from the calculating unit 601b, the second closing processing unit 601c outputs a closing signal to close the second opening/closing valve 205 to a driving unit of the second opening/closing valve 205, as the second closing processing. Accordingly, the second opening/closing valve 205 is closed so that the supply of DIW to the mixing tank 400 is stopped.

As described above, the mixing apparatus 80 of the first exemplary embodiment is configured such that the target value of the supplied amount of DIW is determined, additionally considering the amount of HF supplied to the mixing tank 400 until the first opening/closing valve 105 is completely closed after the first opening/closing valve 105 outputs the closing signal, as well.

Accordingly, even when the actually supplied amount of HF is deviated from the HF target value 602a, a mixed ratio 602b is prevented from deviating from the mixed ratio since the target value of the supplied amount of DIW is determined based on the deviation value. Therefore, according to the mixing apparatus 80 of the first exemplary embodiment, the accuracy of the mixed ratio may be improved.

Figure 5:
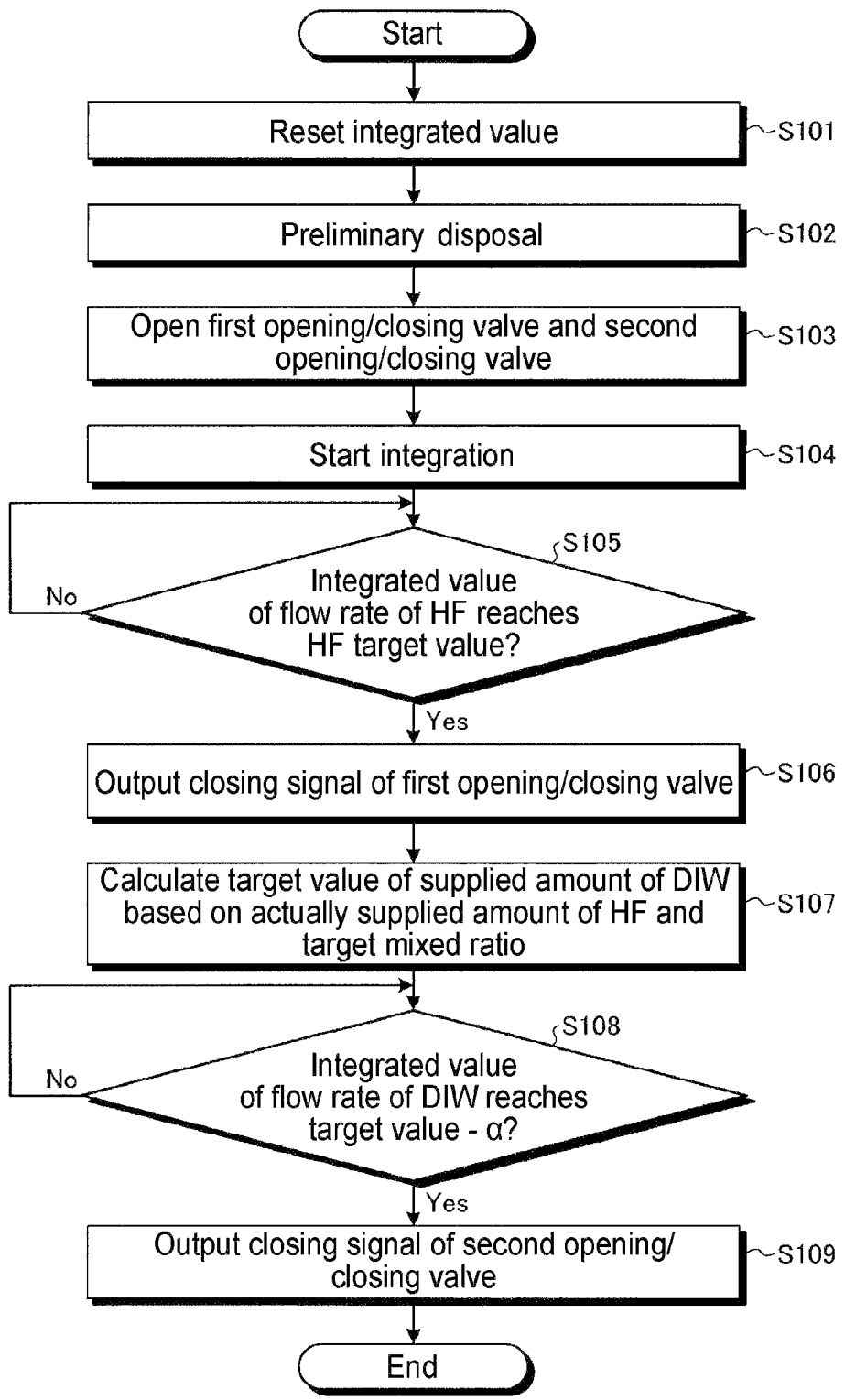
FIG. 5 is a flowchart illustrating a processing procedure of a mixing processing according to the first exemplary embodiment.

Next, descriptions will be made with respect to a processing procedure of a mixing processing according to the first exemplary embodiment with reference to FIG. 5. FIG. 5 is a flowchart illustrating a processing procedure of the mixing procedure according to the first exemplary embodiment. When the mixing processing begins, the first opening/closing valve 105, the third opening/closing valve 106, the second opening/closing valve 205, and the fourth opening/closing valve 206 are in the closed state.

As illustrated in FIG. 5, in the mixing apparatus 80, first, the second control unit 601 resets integrated values (values in the previous time) of the flow rates of HF and the DIW (step S101), and then a preliminary disposal processing is performed (step S102). In the preliminary disposal processing, the second control unit 601 opens the third opening/closing valve 106 provided in the first closing line 104 and the fourth opening/closing valve 206 provided in the second closing line 204 for a predetermined period of time. Accordingly, HF is exhausted to the outside through the first disposal line 104 from the first flow path 100, and DIW is exhausted to the outside through the second disposal line 204 from the second flow path 200. After the preliminary disposal processing is finished, the second control unit 601 closes the third opening/closing valve 106 and the fourth opening/closing valve 206.

Subsequently, in the mixing apparatus 80, the second control unit 601 opens the first opening/closing valve 105 and the second opening/closing valve 205 simultaneously (step S103), and then starts integration of the flow rate of HF and the flow rate of DIW (step S104). When the first opening/closing valve 105 and the second opening/closing valve 205 are opened simultaneously as described above, HF and DIW are supplied to the mixing unit 300 approximately simultaneously. Therefore, HF and DIW may be mixed more evenly and quickly.

Here, the second control unit 601 controls the flow rates of HF and DIW by controlling the first flow rate adjusting unit 103 and the second flow rate adjusting unit 203 to supply HF in a ratio which is larger than the ratio of HF in the mixed ratio 602b. For example, when the mixed ratio 602b is HF:DIW=1:100, the second control unit 601 will control the flow rates of HF and the DIW such that the mixed ratio becomes 1.5:100.

Therefore, since the target value of the amount of HF supplied to the mixing tank 400 is reached earlier than the target value of the amount of DIW supplied to the mixing tank 400, the processing of calculating the target value of the supplied amount of DIW may be exactly performed based on the amount of HF actually supplied thereafter.

Also, the second control unit 601 may cause the ratio of HF to be more than the mixed ratio 602b by controlling at least one of the first flow rate adjusting unit 103 or the second flow rate adjusting unit 203. The first flow rate adjusting unit 103 and the second flow rate adjusting unit 203 are examples of flow rate adjusting units.

Subsequently, the first closing processing unit 601a determines whether the integrated value of the flow rate of HF reaches the HF target value 602a (step S105), and when the integrated value reaches the HF target value 602a (step S105, Yes), the first closing processing unit 601a outputs a closing signal of the first opening/closing valve 105 (step S106). Also, when the integrated value of the HF flow rate does not reach the HF target value 602a (step S105, No), the first closing processing unit 601a repeats the processing of step S105 until the integrated value of the HF flow rate reaches the HF target value 602a.

Subsequently, the calculating unit 601b calculates the target value of the supplied amount of DIW based on the actually supplied amount of HF (the integrated value of the flow rate of HF before and after the first closing processing) and the mixed ratio 602b (step S107).

Subsequently, the second closing processing unit 601c determines whether the integrated value of the flow rate of DIW reaches a value obtained by subtracting a predetermined correction value α from the target value calculated in S107 (step S108). Here, the correction value α is, for example, an actually measured value of the flow rate of DIW flowing through the second flow path 200, for example, in a time period until the second opening/closing valve 205 is closed after the second closing processing begins, that is, after closing signal is output to close the opening/closing valve 205. Operators measure the actually measured value in advance and store the value to the second storage unit 602 as the correction value α.

In step S108, when the integrated value of the flow rate of DIW reaches a value obtained by subtracting the predetermined correction value α from the target value calculated in step S107 (step S108, Yes), the second closing processing unit 601c outputs the closing signal of the second opening/closing valve 205 (step S109) and finishes a series of mixing processings. Also, when the integrated value of the flow rate of DIW does not reach the value obtained by subtracting the predetermined correction value α from the target value calculated in step S107 (step S108, No), the second closing processing unit 601c repeats step S108.

Accordingly, when the integrated value of the flow rate of DIW which is measured by the second flow rate measuring unit 202 reaches the value obtained by subtracting the predetermined correction value α from the target value calculated by the calculating unit 601b, the second closing processing unit 601c performs the second closing processing.

Therefore, it is possible to prevent a deviation in a mixed ratio of HF and DIW from being caused depending on the amount of DIW supplied to the mixing tank 400 until the second opening/closing valve 205 is completely closed after the closing signal of the second opening/closing valve 205 is output.

As described above, the mixing apparatus 80 according to the first exemplary embodiment includes the mixing tank 400, the first opening/closing valve 105, the second opening/closing valve 205, the first flow rate measuring unit 102, the second flow rate measuring unit 202, and the second control unit 601. In the mixing tank 400, HF and DIW are mixed in which the amount of DIW is larger than that of HF. The first opening/closing valve 105 opens/closes the first flow path 100 in which HF flows. The second opening/closing valve 205 opens/closes the second flow path 200 in which DIW flows. The first flow rate measuring unit 102 measures the flow rate of HF flowing through the first flow path 100. The second flow rate measuring unit 202 measures the flow rate of DIW flowing through the second flow path 200. The second control unit 601 controls opening/closing of the first opening/closing valve 105 and the second opening/closing valve 205.

Also, when the integrated value of the flow rate of HF measured by the first flow rate measuring unit 102 reaches the target HF target value 602a, the second control unit 601 executes the first closing processing to close the first opening/closing valve 105, calculates a target value of the amount of DIW to be supplied to the mixing tank 400 based on the integrated value of the flow rate of HF before and after the first closing processing, and executes the second closing processing to close the second opening/closing valve 205 based on the calculated target value and the integrated value of the flow rate of DIW measured by the second flow rate measuring unit 202.

Therefore, according to the mixing apparatus 80 of the first exemplary embodiment, accuracy in the mixed ratio may be enhanced.

Modified Embodiment

Figure 6:
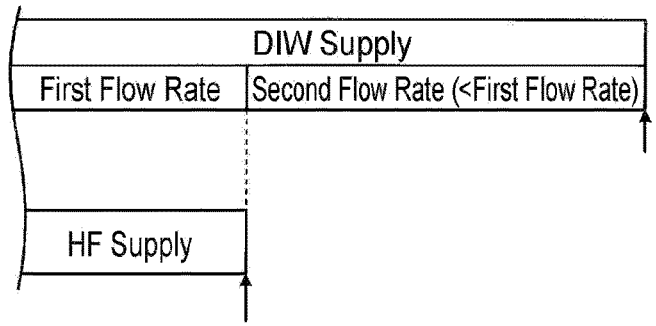
FIG. 6 is an explanatory view of a flow rate changing processing according to a modified embodiment.

In the first exemplary embodiment described above, an example, in which DIW is continuously supplied in a predetermined flow rate until the second opening/closing valve 205 is closed after the second opening/closing valve 205 is opened, has been described. Without being limited thereto, however, the mixing apparatus 80 may reduce the flow rate of DIW after the first closing processing. Hereinafter, a modified embodiment in such a case will be described with reference to FIG. 6. FIG. 6 is an explanatory view of a flow rate changing processing according to the modified embodiment.

As illustrated in FIG. 6, after executing the first closing processing, the second control unit 601 controls the second flow rate adjusting unit 203 (see, e.g., FIG. 3) to change the flow rate of DIW from a first flow rate before the first closing processing to a second flow rate which less than the first flow rate.

Accordingly, as compared to a case where the flow rate of DIW is continuously supplied in the first flow rate, an extra amount of DIW to be supplied to the mixing tank 400 until the second opening/closing valve 205 is completely closed after the closing signal of the second opening/closing valve is output may be suppressed to a small amount. Therefore, as compared to the case where the flow rate of DIW is continuously supplied in the first flow rate, a deviation of a mixed ratio of HF and DIW may be suppressed.

A timing of changing the flow rate of DIW from the first flow rate to the second flow rate does not necessarily have to be simultaneous with the execution of the first closing processing but may be any timing after the first closing processing. In addition, the second control unit 601 may reduce the flow rate of DIW in multiple steps after the first closing processing.

The value of each of the first flow rate and the second flow rate is determined such that the sum of the DIW supplying time in the first flow rate and the DIW supplying time in the second flow rate becomes larger than the sum of the HF supplying time and the time until the first opening/closing valve 105 is completely closed after the closing signal of the first opening/closing valve 105 is output. More specifically, assuming that the sum of the estimated value of the HF supplying time and the estimated time until the first opening/closing valve 105 is completely closed after the closing signal of the first opening/closing valve 105 is output is T1, the value of the first flow rate is determined such that the amount of DIW supplied for the time T1 in the first flow rate becomes smaller than the estimated value of the target value of the amount of DIW to be supplied to the mixing tank 400. In addition, the value of the second flow rate is determined to be smaller than the determined value of the first flow rate.

As a result, the target value of the amount of HF to be supplied to the mixing tank is reached earlier than the target value of the amount of DIW to be supplied to the mixing tank 400. Thus, the processing of calculating the target value of the supplied amount of DIW may be reliably performed based on the actually supplied amount of HF thereafter.

Second Exemplary Embodiment

Figure 7:
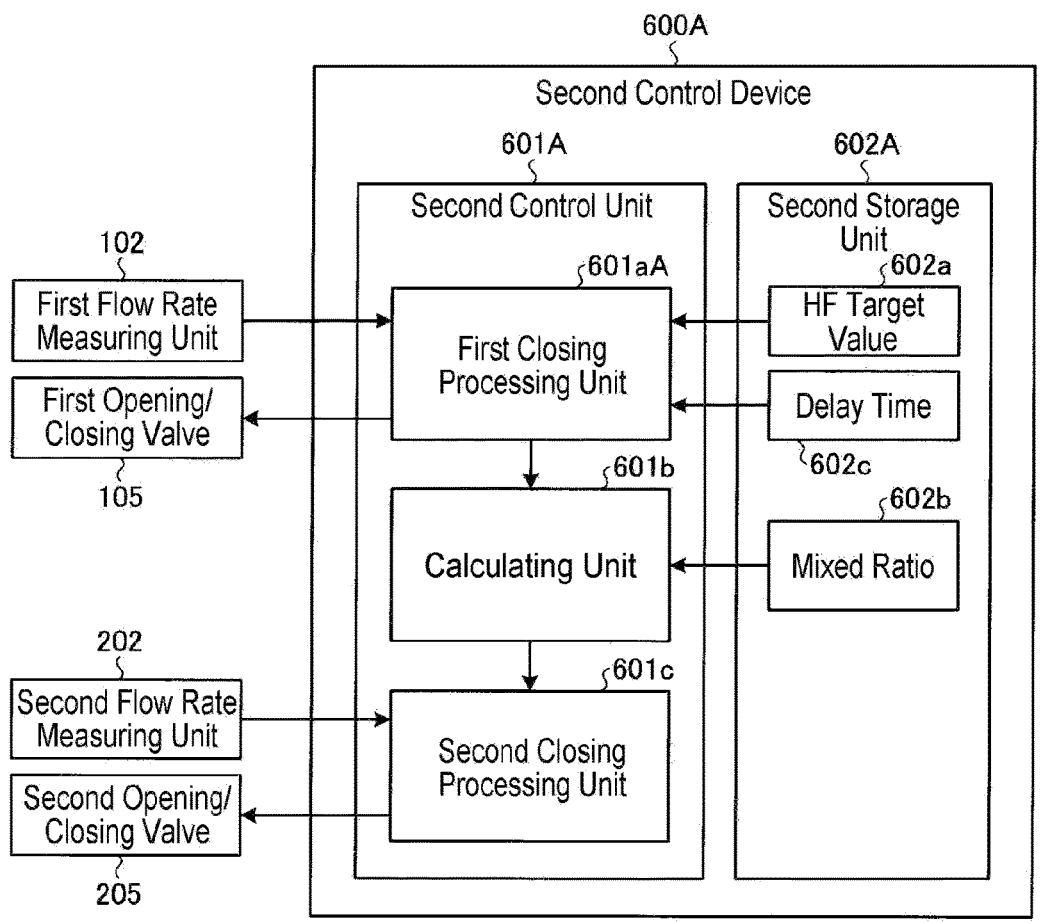
FIG. 7 is a block diagram illustrating a configuration of a second control device according to a second exemplary embodiment.

Next, a second exemplary embodiment will be described. FIG. 7 is a block diagram illustrating a configuration of a second control device according to the second exemplary embodiment. In the following description, the portions which are the same as those described above will be denoted by the same reference numerals and redundant descriptions will be omitted.

As illustrated in FIG. 7, a second control device 600A according to the second exemplary embodiment includes a second control unit 601A and a second storage unit 602A. The second control unit 601A includes a first closing processing unit 601aA, a calculating unit 601b, and a second closing processing unit 601c. The second storage unit 602A stores a HF target value 602a, a mixed ratio 602b, and a delay time 602c.

The delay time 602c is information representing a time of causing the integration processing of the HF flow rate to be continued after the first closing processing is executed. The delay time 602c is input through an input unit such as, for example, a keyboard (not illustrated) by, for example, an operator. Also, the time until the first opening/closing valve 105 is completely closed after the first closing processing is executed is set as the delay time 602c. In the present exemplary embodiment, the time is less than 1 second, for example, 0.3 seconds.

The first closing processing unit 601aA continuously calculates the integrated flow rate of HF until the delay time 602c elapses after the first closing signal for closing the first opening/closing valve 105 is output, and when the delay signal 602c elapses, the first closing processing unit 601aA outputs the integrated value at the time when the delay time 602c elapses. Then, the calculating unit 601b calculates the target value of the amount of DIW to be supplied to the mixing tank 400 based on the obtained integrated value.

As described above, the mixing apparatus 80 according to the second exemplary embodiment is configured such that, when the integrated value of the flow rate of HF reaches a predetermined target value, the target value of the amount of DIW to be supplied to the mixing tank 400 is calculated based on the integrated value of the flow rate of HF after the predetermined delay time 602c elapses.

As a method of calculating the target value of the supplied amount of DIW, for example, it may be considered that the integration processing of the flow rate of HF is continued until an increase in the integrated value is stopped, and then the target value of the supplied amount of DIW based on the integrated value at the time when the increase of the integrated value is stopped. However, in such a case, when the supply of HF is not stopped due to, for example, trouble of the first opening/closing valve 105, the integrated value of the flow rate of HF continuously increases. Therefore, the target value of the supplied amount of DIW may not be decided. Furthermore, when the integrated value of the supplied amount of HF continuously increases, the amount of DIW supplied to the mixing tank 400 may also continuously increase. As a result, DHF may overflow from the mixing tank 400.

Thus, the mixing apparatus 80 according to the second exemplary embodiment is configured such that the integration processing of the flow rate of HF is stopped at the time when the delay time 602c elapses. Accordingly, even if the supply of HF is not stopped, it may be possible to prevent a situation where the target value of the supplied amount of DIW is not decided or a situation where DHF overflows from the mixing tank 400. In addition, in such a case, an abnormality of the first opening/closing valve 105 may be detected by detecting an abnormality in normality of DHF by a density meter (not illustrated) which is provided in, for example, the first circulation line 500, the third flow path 700 or the second circulation line 900. The abnormality of the first opening/closing valve 105 may also be detected by detecting whether HF continuously flows in the first flow path 100 using the first flow rate measuring unit 102.

Figure 8:
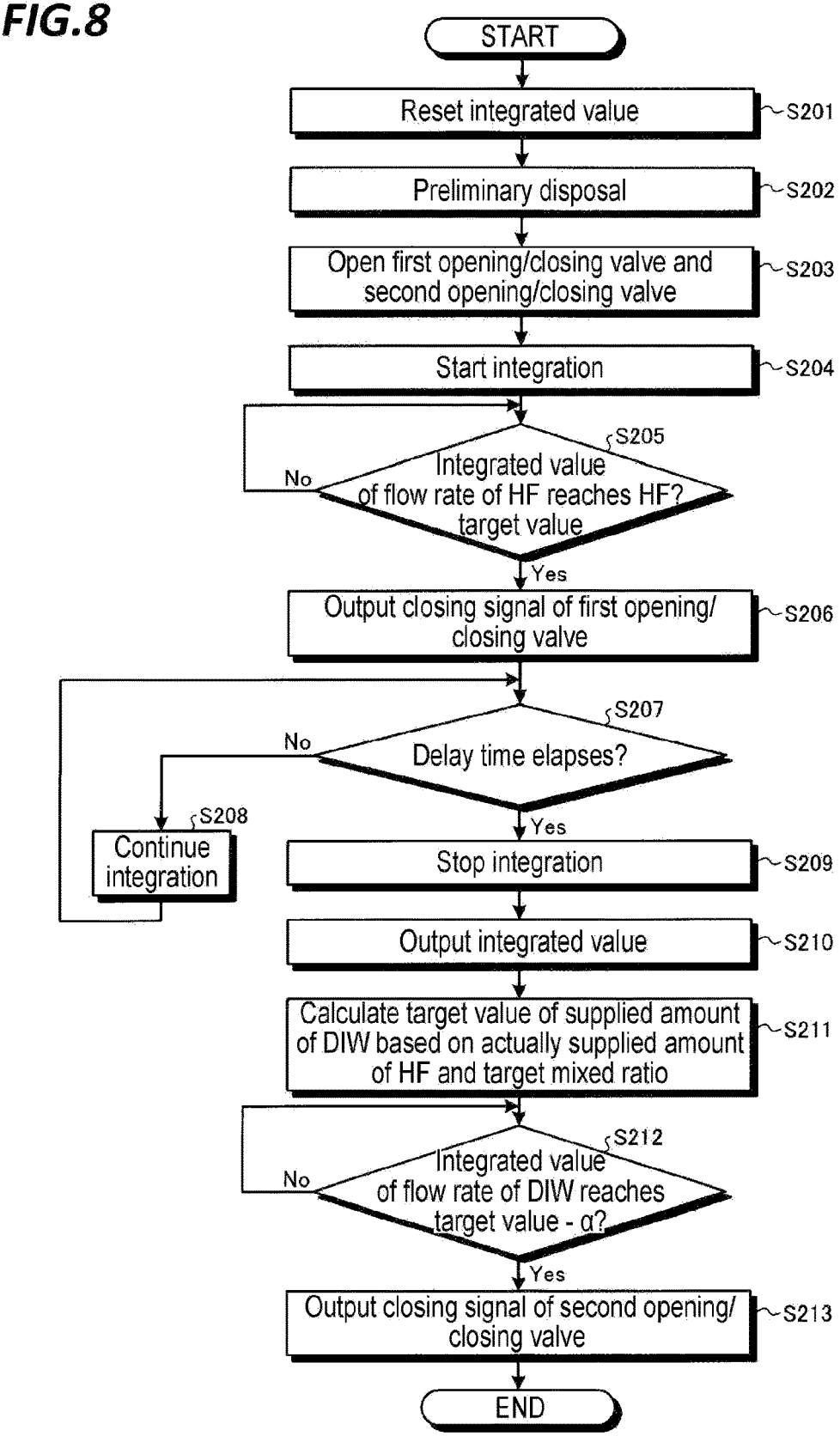
FIG. 8 is a flowchart illustrating a processing procedure of a mixing processing according to the second exemplary embodiment.

Next, a processing procedure of a mixing processing according to the second exemplary embodiment will be described with reference to FIG. 8. FIG. 8 is a flowchart illustrating the processing procedure of the mixing processing according to the second exemplary embodiment. Because the processing of steps S201 to S206 and S211 to S213 illustrated in FIG. 8 is the same as the processing of steps S101 to S106 and S107 to S109, descriptions thereon will be properly omitted.

As illustrated in FIG. 8, after the closing signal of the first opening/closing valve 105 is output (step S206), the first closing processing unit 601aA determines whether the delay time 602c stored in the second storage unit 602A elapses (step S207). In this process, when the delay time 602c does not elapses (step S207, No), the first closing processing unit 601 aA continues calculating the integrated value of the flow rate of HF until the delay time 602c elapses (step S208).

Subsequently, when it is determined that the delay time 602c elapses (step S207, Yes), the first closing processing unit 601aA stops the calculating processing of the integrated value of the flow rate of HF (step S209) and outputs the integrated value of the flow rate of HF to the calculating unit 601b (step 210). In addition, the calculating unit 601b calculates the target value of the supplied amount of DIW based on the integrated value (actually supplied amount of HF) obtained from the first closing processing unit 601aA and the mixed ratio 602b (step S211).

Although, in the above-described exemplary embodiment, the delay time 602c input by, for example, the operator is used, the mixing apparatus may perform a process of optimizing the delay time 602c depending on the time until the increase of the integrated value of the flow rate of HF is stopped after the first closing processing is performed.

In such a case, the second control unit 601A continuously performs the calculating processing of the integrated value without stopping the calculating processing of the integrated value in step S209 of the FIG. 8 even after the integrated value in step S210 is output to the calculating unit 601b.

Here, when the supply of HF is completely stopped before the delay time 602c elapses, the integrated value of the flow rate of HF does not increase after the delay time 602c elapses. That is, at the time when the delay time 602c elapses, the integrated value and the actually supplied amount of HF are coincident with each other. For this reason, the target value of the supplied amount of DIW calculated using the integrated value at the time when the delay time 602c is coincident with the amount to be actually supplied.

Meanwhile, assuming that HF is continuously supplied after the delay time 602c elapses, the integrated value of the flow rate of HF continuously increases even after the delay time 602c elapses. Accordingly, the actually supplied amount of HF becomes more than the integrated value at the time when the delay time 602c elapses. Therefore, the target value of the supplied amount of DIW calculated using the integrated value obtained at the time when the delay time is elapses deviates from the amount of DIW to be actually supplied.

Therefore, when the time until the increase in the integration value of the flow rate of HF stops after the first closing processing is executed (hereinafter, referred to as "integrated value increase time") exceeds the delay time 602c, the second control unit 601A may increase the delay time 602c. Accordingly, the target value of the supplied amount of DIW may be prevented from deviating from the amount to be actually supplied. In such a case, the second control unit 601A may perform the first closing processing using the modified delay time 602c in the next mixing processing. Optimizing the delay time 602c in this manner is effective, for example, when the opening/closing valve (here, the first opening/closing valve 105) is not completely closed within the delay time 602c set by, for example, the operator due to individual differences of the opening/closing valve.

Figure 9:
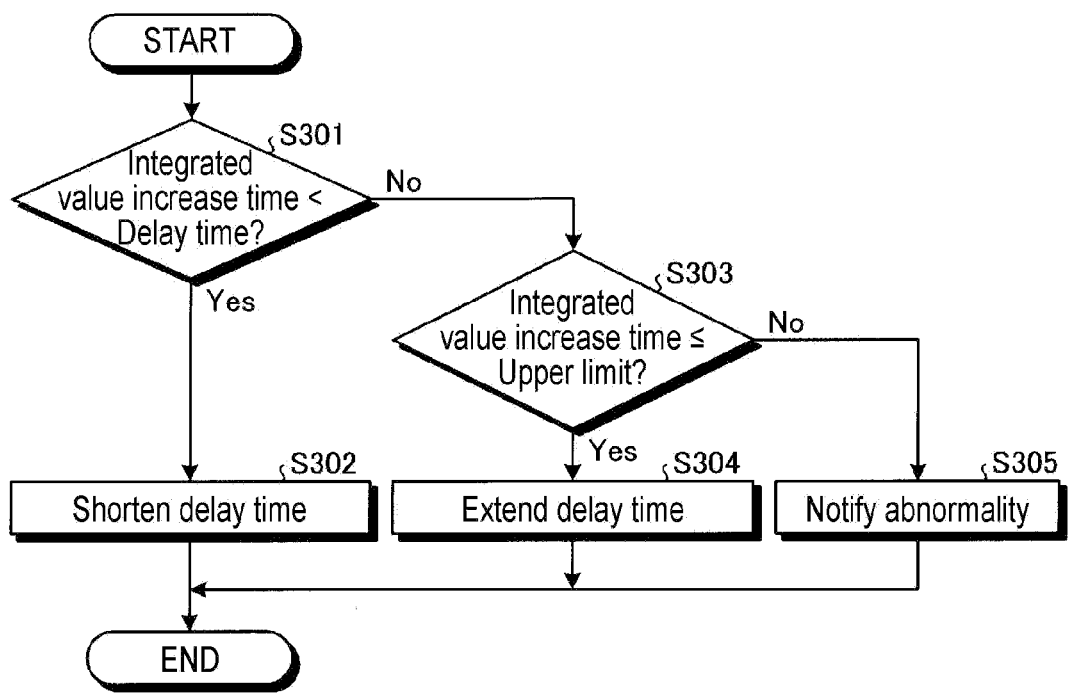
FIG. 9 is a flowchart illustrating a processing procedure of a delay time optimization processing according to the second exemplary embodiment.

Next, the above-described optimization processing of the delay time 602c will be described in detail with reference to FIG. 9. FIG. 9 is a flowchart illustrating the processing procedure of the delay time optimization processing according to the second exemplary embodiment.

As illustrated in FIG. 9, the second control unit 601A determines whether the integrated value increase time is less than the delay time 602c (step S301). That is, the second control unit 601A determines whether the time required until the increase of the integrated value of the flow rate of HF is stopped after the first closing processing is executed is less than the delay time 602c.

In this processing, when it is determined that the integrated value increase time is less than the delay time 602c (step S301, Yes), the second control unit 601A shortens the delay time 602c (step S302). For example, assuming that the integrated value increase time is X1 and the delay time is X2, the second control unit 601A stores $X2-\{(X2-X1)\times \beta\}$ to the storage unit 602 as a new delay time 602c. That is, the second control unit 601A shortens the delay time 602c by the time obtained by multiplying a predetermined coefficient β (0<β<1) to a difference in time between the delay time 602c and the integrated value increase time. Accordingly, even if an excessively long delay time 602c is set with respect to the integrated value increase time, an unnecessary waiting time due to such a delay time 602c may be reduced.

Subsequently, when the integrated value increase time is not less than the delay time 602c (step S301, No), that is, when the integrated value increase time is equal to or larger than the delay time 602c, the second control unit 601A determines whether the integrated value increase time is equal to or less than a predetermined upper limit (step S303).

In this processing, when it is determined that the integrated value increase time is equal to or less than the upper limit (step S303, Yes), the second control unit 601A increases the delay time (step S304). For example, the second control unit 601A stores the integrated value increase time to the second storage unit 602A as a new delay time 602c. Accordingly, the target value of the supplied amount of DIW may be prevented from being deviated from the amount of DIW to be actually supplied.

Meanwhile, when the integrated value increase time is not equal to or less than the upper limit (step S303, No), that is, when the integrated value increase time is larger than the upper limit, the second control unit 601A performs a processing of notifying an abnormality of the mixing apparatus 80 (step S305). For example, the second control unit 601A may either turn ON an indicating lamp (not illustrated) provided in the mixing apparatus 80, or cause a display unit (not illustrated) to display occurrence of the abnormality in a supplying system of the mixing apparatus 80.

Here, the supplying system of the mixing apparatus 80 refers to the first opening/closing valve 105 or the first flow rate measuring unit 102. That is, when the integrated value increase time exceeds the upper limit, HF may leak out due to the abnormality of the first opening/closing valve 105 or the integrated value may continuously increase due to the abnormality of the first flow rate measuring unit 102 even though the supply of HF is completely stopped.

When the abnormality of the supplying system is notified in the case where the integrated value exceeds the upper limit, the mixing apparatus 80 may be quickly returned to its normal state.

Also, the integrated value increase time used in the determining processing of steps S301 and S303 may be an average value of a plurality of integrated value increase times stored in the second storage unit 602. That is, the second control unit 601A may accumulate integrated value increase times to the second storage unit 602 whenever a series of processings illustrated in FIG. 8 is performed, calculate the average value of the integrated value increase times from a plurality of accumulated integrated value increase times, and then perform the determining processing of steps S301 and S303 using the calculated average value of the integration value increase times.

Although in the above-described exemplary embodiment, an example of supplying HF and DIW simultaneously to the mixing tank 400 has been described, the timing of starting supply of HF and DIW does not necessarily have to be simultaneous.

Also, in the exemplary embodiment described above, although the second opening/closing valve 205 is closed when the integrated value of DIW flow rate reaches a value obtained by subtracting the correction value α from the target value calculated by the calculating unit 601b, it is not always necessary to use the correction value α. Thus, the second closing processing unit 601c may close the second opening/closing valve 205 when the integrated value of the flow rate of DIW reaches the target value calculated by the calculating unit 601b. This is due to the following reason. Since the supplied amount of DIW is larger than that of HF, even if the actually supplied amount of DIW deviates from the target value, it has less effect in the mixed ratio as compared to a case where the actually supplied amount of HF deviates from the target value. For this reason, the supply of HF is stopped earlier than stopping the supply of DIW in the exemplary embodiment descried above. That is, when the target value of the supplied amount of DIW is determined based on the actually supplied amount of HF, it may be considered that there is no deviation in the supplied amount of HF. As a result, the accuracy in the mixed ratio may be enhanced as compared to the case where the target value of the supplied amount of DIW is determined.

Further, although in the above-described exemplary embodiment, an example in which the first liquid is HF and the second liquid is DIW has been described, the first liquid and the second liquid may be other than the liquids disclosed above.

Furthermore, although in the above-described exemplary embodiment, descriptions have been made on an example in which the second control device 600 (see, e.g., FIG. 3) configured to control the mixing apparatus 80 is included apart from the control device 4 (see, e.g., FIG. 1) configured to control the substrate processing system 1, the second control device 600 may be omitted by making the control device 4 have the function of the second control device 600.

From the foregoing descriptions, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A substrate processing apparatus comprising:
a mixing tank configured to mix a first liquid and a second liquid therein, the second liquid being mixed in an amount more than that of the first liquid;
a first valve configured to open/close a first flow path in which the first liquid flows;
a second valve configured to open/close a second flow path in which the second liquid flows;
a first flowmeter unit configured to measure a flow rate of the first liquid flowing through the first flow path;
a second flowmeter unit configured to measure a flow rate of the second liquid flowing through the second flow path;
a mixer provided at a downstream of the first and second flow paths before the mixing tank and configured to mix the first liquid and the second liquid with a predetermined mixing ratio and supply the mixed liquid to the mixing tank;
a first temperature adjusting mechanism provided in the first flow path, the first temperature adjusting mechanism adjusting a temperature of the first liquid flowing through the first flow path;
a second temperature adjusting mechanism provided in the second flow path, the second temperature adjusting mechanism adjusting a temperature of the second liquid flowing through the second flow path;

a controller configured to control an opening/closing of the first valve and the second valve; and a substrate processing chamber configured to process a substrate by supplying a mixed liquid of the first liquid and the second liquid to the substrate, wherein, the controller is configured to:

measure a first integrated flow amount of the first liquid using the first flowmeter after the first valve is opened, and when the first integrated flow amount of the first liquid reaches a predetermined target value transmit a first closing signal to the first valve to close the first valve, and measure a second integrated flow amount of the first liquid during a delay time of the first valve to be actually closed after the controller transmits the first closing signal to the first valve where the delay time is experimentally measured in advance, calculate a target value of an amount of the second liquid to be supplied to the mixing tank based on an added amount of the first and second integrated flow amounts of the first liquid such that the predetermined mixing ratio between the first liquid and the second liquid is maintained, and transmit a second closing signal to the second valve to close the second valve when an integrated flow amount of the second liquid measured by the second flowmeter reaches the calculated target value, and each of the first temperature adjusting mechanism and the second temperature adjusting mechanism is a water jet.

2. The substrate processing apparatus of claim 1, wherein the controller is configured such that when the second integrated flow rate of the first liquid increases after the delay time elapses, an abnormality is notified.

3. The substrate processing apparatus of claim 1, further comprising:

a liquid flow controller configured to adjust the flow rate of the first liquid flowing through the first flow path or the flow rate of the second liquid flowing through the second flow path, wherein the controller is configured to control the liquid flow controller such that a ratio of the first liquid flowing through the first flow path becomes more than the predetermined mixing ratio of the first liquid and the second liquid.

4. The substrate processing apparatus of claim 1, further comprising:

a liquid flow controller configured to adjust the flow rate of the second liquid flowing through the second flow path, wherein the controller is configured to control the liquid flow controller after closing the first valve such that the flow rate of the second liquid becomes smaller than the flow rate before closing the first valve.

5. The substrate processing apparatus of claim 1, wherein the controller is configured to close the second valve when the integrated flow amount of the second liquid measured by the second flowmeter reaches a value obtained by subtracting a predetermined correction value from the calculated target value.

6. The substrate processing apparatus of claim 5, wherein the correction value is determined based on the flow rate of the second liquid passing through the second flow path in a time until the second valve is closed after the second closing signal is transmitted to the second valve.

7. The substrate processing apparatus of claim 1, wherein, when supply of the first liquid and the second liquid to the mixed tank is started, the controller is configured to open the first valve and the second valve simultaneously.

8. The substrate processing apparatus of claim 1, wherein the second flow path allows the second liquid to flow into the mixing tank as a main stream, and the first flow path allows the first liquid to flow into the mixing tank as a tributary stream.

9. The substrate processing apparatus of claim 8, wherein the first flow path and the second flow path are connected with each other in a connecting portion at a more downstream side than the first valve and the second valve, and connected to the mixing tank at a more downstream side than the connecting portion.

* * * * *